(12) United States Patent
Kadlec

(10) Patent No.: US 11,278,982 B2
(45) Date of Patent: Mar. 22, 2022

(54) WELDING POWER SYSTEM WITH INTEGRATED PURGE GAS CONTROL

(71) Applicant: Illinois Tool Works Inc., Glenview, IL (US)

(72) Inventor: Mark Steven Kadlec, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/273,702

(22) Filed: Feb. 12, 2019

(65) Prior Publication Data

US 2019/0176260 A1 Jun. 13, 2019

Related U.S. Application Data

(63) Continuation of application No. 14/611,751, filed on Feb. 2, 2015, now Pat. No. 10,201,871.

(51) Int. Cl.
| | |
|---|---|
| *B23K 9/00* | (2006.01) |
| *B23K 9/16* | (2006.01) |
| *B23K 9/32* | (2006.01) |
| *B23K 9/095* | (2006.01) |
| *B23K 10/00* | (2006.01) |
| *B23K 10/02* | (2006.01) |
| *B23K 26/14* | (2014.01) |
| *B23K 26/21* | (2014.01) |
| *B23K 26/70* | (2014.01) |

(52) U.S. Cl.
CPC .............. *B23K 9/16* (2013.01); *B23K 9/095* (2013.01); *B23K 9/326* (2013.01); *B23K 10/00* (2013.01); *B23K 10/02* (2013.01); *B23K 26/14* (2013.01); *B23K 26/21* (2015.10); *B23K 26/702* (2015.10)

(58) Field of Classification Search
CPC .......... B23K 9/325; B23K 9/16; B23K 9/0956
USPC ................ 228/102–103, 218–219, 8–11, 42; 219/74, 121.33, 121.51, 137.42, 137.9
See application file for complete search history.

(56) References Cited

U.S. PATENT DOCUMENTS

| | | |
|---|---|---|
| 3,621,177 A | 11/1971 | McPherson |
| 4,100,390 A | 7/1978 | Jackson |

(Continued)

FOREIGN PATENT DOCUMENTS

| | | |
|---|---|---|
| DE | 3544280 A1 | 6/1987 |
| DE | 102009022846 B3 * | 2/2011 |

(Continued)

OTHER PUBLICATIONS

Purge Pipe Systems http://www.ncpwb.org/technicalresources/NCPWB-TR-PurgeTips.pdf (published Nov. 26, 2013 according to waybackmachine.org).*

(Continued)

*Primary Examiner* — Kiley S Stoner
(74) *Attorney, Agent, or Firm* — McAndrews, Held & Malloy, Ltd.

(57) ABSTRACT

A welding power system including a controller with (a) a data input device via which a an operator can input parameters relating to a volume of an interior of one more pieces to be welded and (b) that calculates and outputs a purge time, the purge time being a time period needed to replace an atmosphere within the volume with a purge gas at a predetermined flow rate of the purge gas.

25 Claims, 6 Drawing Sheets

(56) References Cited

U.S. PATENT DOCUMENTS

| | | | | |
|---|---|---|---|---|
| 4,101,067 | A * | 7/1978 | Sloan | B23K 31/027 219/136 |
| 4,541,055 | A * | 9/1985 | Wolfe | B23K 26/08 700/166 |
| 4,547,855 | A * | 10/1985 | Lanyi | B23K 26/0613 700/166 |
| 4,916,281 | A * | 4/1990 | Flasche | B23K 9/0282 219/61 |
| 5,304,776 | A * | 4/1994 | Buerkel | B23K 9/0286 219/125.11 |
| 5,643,994 | A | 7/1997 | Kish | |
| 5,711,474 | A | 1/1998 | Hummel | |
| 5,864,111 | A * | 1/1999 | Barefoot | B23K 9/0286 219/61 |
| 5,918,793 | A | 7/1999 | Kopke | |
| 5,958,261 | A | 9/1999 | Offer | |
| 5,965,635 | A | 10/1999 | Rancich | |
| 6,121,570 | A * | 9/2000 | Oakley | H05H 1/36 219/121.44 |
| 6,206,837 | B1 * | 3/2001 | Brugnoli | A61B 5/0002 600/301 |
| 6,228,207 | B1 | 5/2001 | Rancich | |
| 6,353,043 | B1 | 3/2002 | Rice | |
| 6,739,204 | B1 * | 5/2004 | Barefoot | B23K 37/0533 73/861.32 |
| 2002/0163196 | A1 | 11/2002 | Brofft | |
| 2006/0213892 | A1 * | 9/2006 | Ott | B23K 9/16 219/132 |
| 2006/0230929 | A1 * | 10/2006 | Bliss | B01D 53/0407 95/96 |
| 2008/0190172 | A1 * | 8/2008 | Jones | G01N 21/6428 73/23.2 |
| 2008/0217378 | A1 * | 9/2008 | Richard | B23K 9/325 228/102 |
| 2009/0044661 | A1 * | 2/2009 | Li | H01J 37/32541 75/10.19 |
| 2009/0302007 | A1 * | 12/2009 | Richard | B23K 9/16 219/59.1 |
| 2010/0012625 | A1 * | 1/2010 | Silk | B23K 9/325 219/59.1 |
| 2010/0174455 | A1 * | 7/2010 | Powell | F01N 13/008 701/51 |
| 2010/0199637 | A1 * | 8/2010 | Powell | F03D 9/25 60/277 |
| 2010/0276406 | A1 | 11/2010 | Silk | |
| 2010/0314369 | A1 | 12/2010 | Kaufman | |
| 2010/0314375 | A1 | 12/2010 | Kaufman | |
| 2010/0325889 | A1 * | 12/2010 | Buttress | B23K 9/16 29/890.033 |
| 2011/0089225 | A1 * | 4/2011 | Patrick | B23K 9/325 228/221 |
| 2011/0127238 | A1 | 6/2011 | Johnson | |
| 2011/0128238 | A1 * | 6/2011 | Han | G06F 3/017 345/173 |
| 2011/0174791 | A1 | 7/2011 | Stanzel | |
| 2011/0287534 | A1 * | 11/2011 | Rowley | A01N 1/0268 435/374 |
| 2012/0096740 | A1 * | 4/2012 | Naylor | F17D 1/04 34/562 |
| 2013/0284297 | A1 * | 10/2013 | Hacikyan | F16L 55/134 138/93 |
| 2014/0117068 | A1 * | 5/2014 | Hacikyan | B23K 9/325 228/57 |
| 2014/0131325 | A1 | 5/2014 | Zhang | |
| 2014/0326779 | A1 * | 11/2014 | Hacikyan | B23K 9/326 228/42 |
| 2016/0003738 | A1 * | 1/2016 | Harder | B23K 9/32 228/42 |
| 2016/0069833 | A1 * | 3/2016 | Hacikyan | G01N 33/0062 73/31.01 |
| 2016/0074955 | A1 * | 3/2016 | Evans | B23K 9/326 228/219 |
| 2016/0256961 | A1 * | 9/2016 | Clemmons | B23K 31/02 |
| 2018/0128799 | A1 * | 5/2018 | Hacikyan | G01N 27/4162 |

FOREIGN PATENT DOCUMENTS

| | | | |
|---|---|---|---|
| DK | WO 96/11765 | * | 4/1996 |
| KR | 2002042568 A | * | 6/2002 |
| KR | 20150125390 A | * | 11/2015 |
| WO | 2008051829 A2 | | 5/2008 |

OTHER PUBLICATIONS www.sperkoengineering.com/html/Purge%20Time%207-00.XLS "Purge Time" (no date available).*

Int'l Search Report and Written Opinion Appln. No. PCT/US2015/065698 dated Apr. 14, 2016.

* cited by examiner

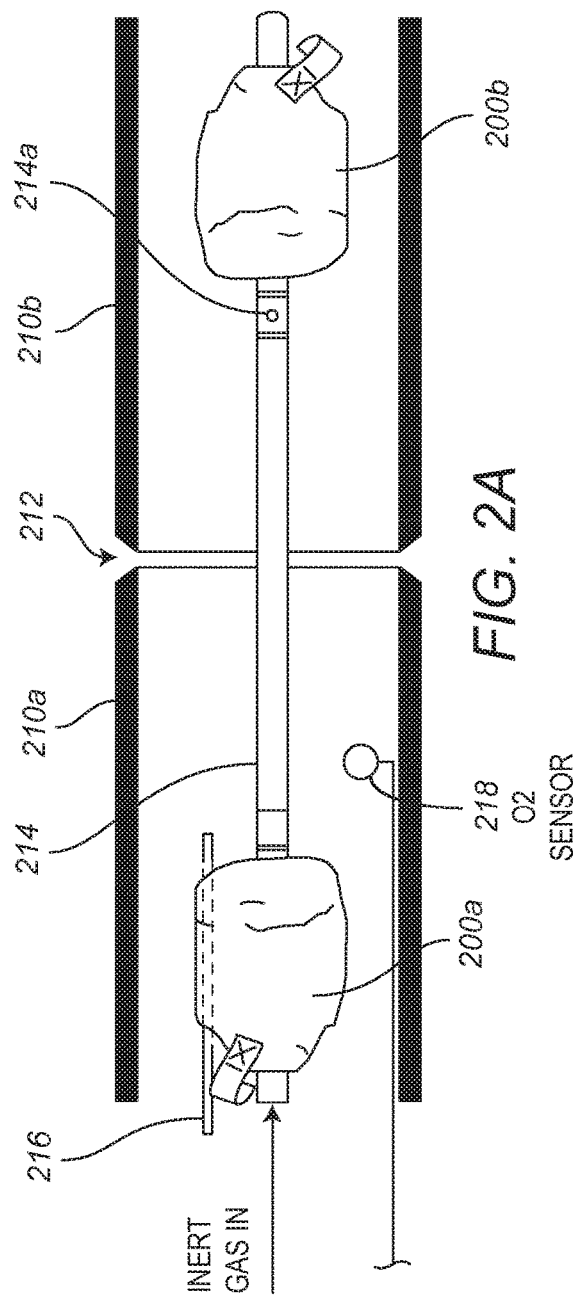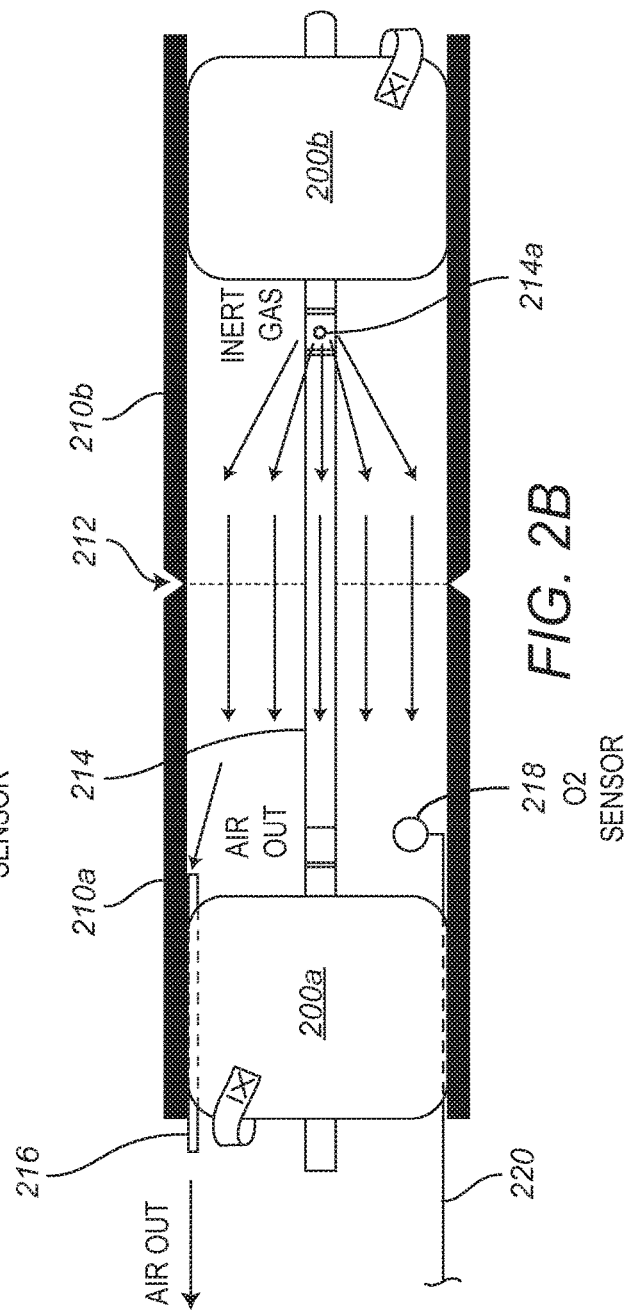

WELDING POWER SYSTEM WITH INTEGRATED PURGE GAS CONTROL

The present application is a continuation of U.S. application Ser. No. 14/611,751 filed Feb. 2, 2015, and entitled "Welding Power System With Integrated Purge Gas Control." The above-identified application is hereby incorporated herein by reference in its entirety.

BACKGROUND

The present disclosure generally relates to welding power systems, of which welding power supplies is one type. More particularly, the disclosure relates to welding power systems used in situations utilizing purge gas, such as the welding of corrosion resistant metal containers, typically pipes and tubes.

During the welding of steels, oxidation occurs in the weld seam if oxygen reaches the weld area. This situation is even more acute with stainless steel, titanium, zirconium, molybdenum and other gas-reactive metals and alloys. The resulting oxidized surfaces are no longer corrosion-resistant, and further treatment is necessary.

To avoid costly and not necessarily satisfactorily effect subsequent treatment of the welds, the atmosphere around the weld is purged of oxygen. This reduces the amount of oxygen to levels that do not adversely affect the welds.

With purging, a gas is used to protect the weld seam until it has cooled to the point that oxidation no longer can occur. Usually, an inert gas, such as argon which is heavier than air, is used. Other purging gases such as nitrogen and nitrogen/hydrogen blends can also be used.

With pipes and tubes, the seam to be welded can be isolated using dams inserted into the pipes and tubes. The dams create a volume within the pipes or tubes within which the weld seam is located. The volume is determined by the diameters and lengths of the pipe or tube sections involved. For non-tubular shapes, the appropriate parameters for determining the volumes of the interior spaces are used.

The flow rate of the purge gas is important, if not critical. Too high of a flow rate results in unwanted turbulence of the air and an undesirable mixing of the oxygen into the purge gas. at which the welder should purge. Actually, the flow depends largely on the volume to be purged.

Typically, the purge gas flow is set to be just high enough to gently force the oxygen out of the volume to be purged and maintain a pressure inside the volume that is sufficiently higher than the pressure outside of the volume. This prevents excess turbulence in and re-entry of oxygen into the purged volume.

An important consideration is the purge time needed to create oxygen level conditions suitable for good welding. The purge time is a function of flow rate and the size of the volume to be purged. A general formula is: PT=(4×D×L)/PR, where PT is the purge time (typically minutes), D is the diameter of the pipe, L is the length of the pipe and PR is the purge rate (typically in cubic feet per hour).

Of course, the ultimate determinant of end of purging is the amount of oxygen within the volume. This is determined by one or more oxygen sensors, and can vary depending upon the type of metal involved. Welding conditions are usually reached when the oxygen sensor indicates a suitable value such as below 70 PPM for stainless steel or below 50 PPM for titanium. Semiconductors can require a level below 10 PPM. Purging can continue until the weld seam has cooled sufficiently so that oxidation can no longer occur.

The time to purge to reach ready-to-weld oxygen conditions can be relatively long for larger volumes. For a 6 inch diameter piper, an a typical volume, this can be 40 minutes or so. Thus, there can be much down time for a welder, or much wasted time checking the oxygen sensor.

The welding parameters are usually set by specification and enforced by quality control.

Presently, the purge time to reach ready-for-welding oxygen conditions are calculated manually by the welders using a handheld calculator or in their head. They can also be specified on a specification sheet.

SUMMARY

The present disclosure provides one or more inventions in which a purge gas controller is integrated into a welding power system. With this integration, purge gas usage can be more strictly controlled and accounted for. Further, in specific embodiments, reaching of oxygen welding conditions can be signaled.

There are many types of welding power systems used for different welding purposes. Welding power system, as used herein, comprises one or more of a welding-type power supply, a controller, a wirefeeder, a cooler, a plasma cutter, an induction heater, a gas mixer and so forth.

A welding power supply, as used herein, is a power source that can provide welding-type power.

Welding-type power, as used herein, refers to power suitable for electric arc welding, plasma cutting or induction heating. Electric arc welding includes processes such as GMAW (MIG), GTAW (TIG), SMAW (stick), SAW, laser, hot wire, etc. Although in the preferred embodiment, a GTAW welding process is generally used, it is understood that other welding processes may benefit from this invention.

The term "logically configured" means any combination of circuitry, firmware and/or software (machine readable instructions), that causes a controller to effect logic implementing algorithms or control discussed herein.

In an embodiment, a welding power system comprises a controller with (a) a data input device via which a an operator can input parameters relating to or a value of a volume of an interior of one more pieces to be welded and (b) that calculates and outputs a purge time, the purge time being a time period needed to replace an atmosphere within the volume with a purge gas at a predetermined flow rate of the purge gas.

In an embodiment, the welding power system is a welding power supply.

In an embodiment, the controller is logically configured to receive an output from a flow meter and monitor flow of the purge gas into the volume.

In an embodiment, the controller is logically configured to receive outputs from one or more oxygen sensors and determine if a threshold oxygen level within the volume is met.

In an embodiment, the controller is logically configured to control a flow regulator in accordance with the purge time, an oxygen sensor output or both.

In an embodiment, the welding power system includes a memory in communication with the controller, and the controller is logically configured to store in the memory purge gas flow measurements, oxygen level measurements, the purge gas parameters, the purge time, or time stamp data, or any combination of the foregoing.

In an embodiment, a welding power system, includes:
a controller;
a data input device;
a flow meter signal input;
an oxygen sensor signal input; and
a purge gas flow regulator,
wherein,
the controller is logically configured to receive by way of the input device purge parameters defining or a value of a volume within an interior of one or more pieces to be welded by way of the input device or a measure of volume of the interior,
the controller is logically configured to calculate a purge time based on the purge parameters and a predetermined purge gas flow rate, the purge time being a time period needed to replace an atmosphere within the volume with a purge gas at the predetermined flow rate of the purge gas,
the controller is logically configured to generate a flow regulator control signal based on a flow meter signal, an oxygen sensor signal, or both.

In an embodiment, the controller includes a communications module and the controller is logically configured to signal elapse of purge time by communicating an alert to the operator via the communications module.

In an embodiment, the welding power system includes an audible alert device in communication with the controller, and the controller is logically configured to signal elapse of purge time by communicating an alert to the operator via the audible alert device.

In an embodiment, the welding power system includes a visual alert device in communication with the controller, and the controller is logically configured to signal end of purge time by communicating an alert to the operator via the visual alert device.

In an embodiment, the welding power system includes a communications module in communication with the controller, and the controller is logically configured to communicate a message via the communications module.

In an embodiment, the communications module includes a wireless communication module via which the message is communicated.

In an embodiment, the wireless communications module is configured to communicate via a cellular communications network.

In an embodiment, the wireless communications module is configured to communicate via a wireless communications network.

In an embodiment, the welding power system includes a wireless communications module in communication with the controller and at least one oxygen sensor.

In an embodiment, the welding power system includes a wireless communication module in communication with the controller and at least one flow meter.

These and other features and aspects of the disclosure are described below in the detailed description with reference to the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 2A illustrates in cross section an inflatable flow dam and sensor arrangement prior to inflation of the dams.

FIG. 2B illustrated the arrangement of FIG. 2A post inflation of the dams.

DETAILED DESCRIPTION

Figure 1:
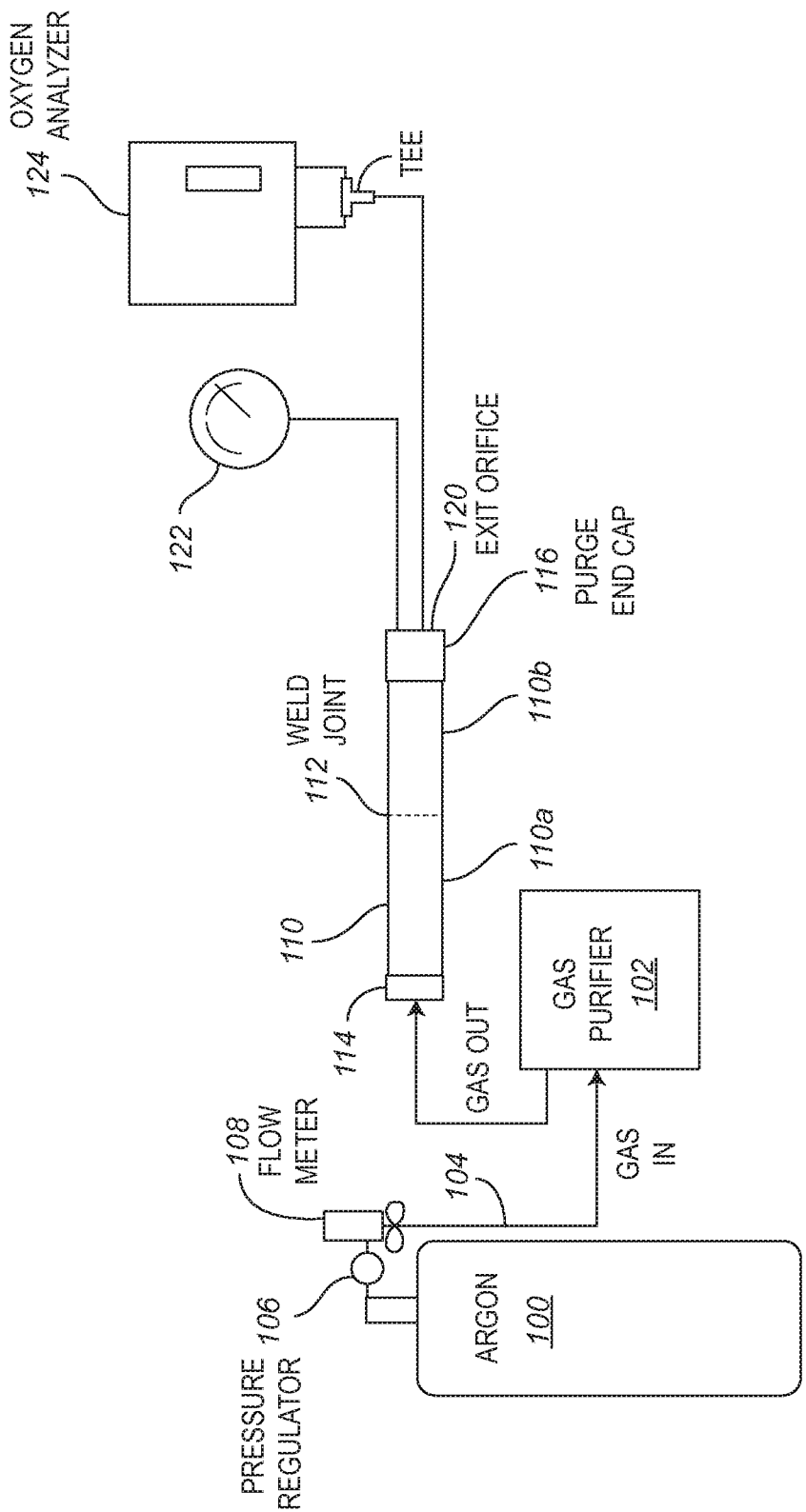
FIG. 1 illustrates a typical arrangement of components for a welding operation in which a purge gas is employed.

The present, disclosure is herein described in detail with reference to embodiments illustrated in the drawings, which form a part hereof. Other embodiments) may be used and/or other changes may be made without departing from the spirit or scope of the present disclosure. The illustrative embodiment(s) described in the detailed description is/are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

In FIG. 1, there is illustrated a typical arrangement when purge gas is employed in a welding operation. Purge gas, typically argon (Ar), is provided in a container 100. The gas is directed to a purifier 102. The line 104 via which the gas is output from the container 100 may include a pressure regulator 106 and/or flow meter 108.

The purified gas is then directed into the interior volume of a item to be welded, which in FIG. 1 is a tube or pipe 110 with abutted sections 110a and 110b to be welded together by weld joint 112. In FIG. 1 the opposite ends of the pipe 110 are capped by end caps 114 and 116. However, as described later, the interior of the pipe sections can be dammed by dams such as inflatable dams.

Typically, as illustrated, the gas is introduced into the interior of the pipe section via the end of one of the sections. However, the gas could be introduced via the ends of both sections. The need, is for a gas exit in at least one end, such as exit orifice 120 via which oxygen richer air is permitted to escape the abutted pipe sections 110a and 110b.

The pressure within the pipe sections 110a and 110b can be monitored by means of a suitable pressure gauge 122 if conditions are such that overpressure is a concern. But, in any event, the oxygen levels are monitored by means of a sensor, not shown, connected to an oxygen analyzer 124 configured to interpret the signals output by the oxygen sensor.

As described above, with this arrangement, the oxygen level within the interior of the pipe sections 110a and 110b can be lowered to a specified level, as described in the Background section above, to provide an interior atmosphere promoting contamination and defect-free welds for the given material of the pipe sections.

FIGS. 2A and 2B illustrate a typical arrangement in which instead of utilizing end caps, inflatable dams 200a and 200b are positioned within the interior of pipe sections 210a and 210b. As illustrated, the inflatable dams 200a and 200b are positioned on opposite sides of the joint 212 where the pipe sections 200a and 200b abut.

As is typical, the inert purge gas is introduced into the interior of a space delimited by the dams 200a and 200b via a feed line 214. The line 214 can extend through both dams. The line 214 includes and exit 214a within the interior space delimited by the dams 200a and 200b. An outlet for the interior atmosphere displaced by the introduced inert gas can be provided by means of an appropriately sized outlet line 216 which is in fluid communication between the interior of the interior space and the outside.

Finally, an oxygen sensor 218 is provided within the interior space delimited by the dams 200a and 200b, and a wire 220 connected to the sensor leads past one of the dams, in this case dam 200a, to an analyzer.

As can be seen in FIG. 2b, once the dams 200a and 200b are inflated, they adequately close off the interiors of the pipe sections 210a and 210b about, the abutment joint 212, allowing for leakage only via the joint 212 and the outline line 216. The oxygen sensor wire is too small to be consequential, and does not impede the sealing action of the dam due to the pliability of the walls of the dam.

Figure 3A:
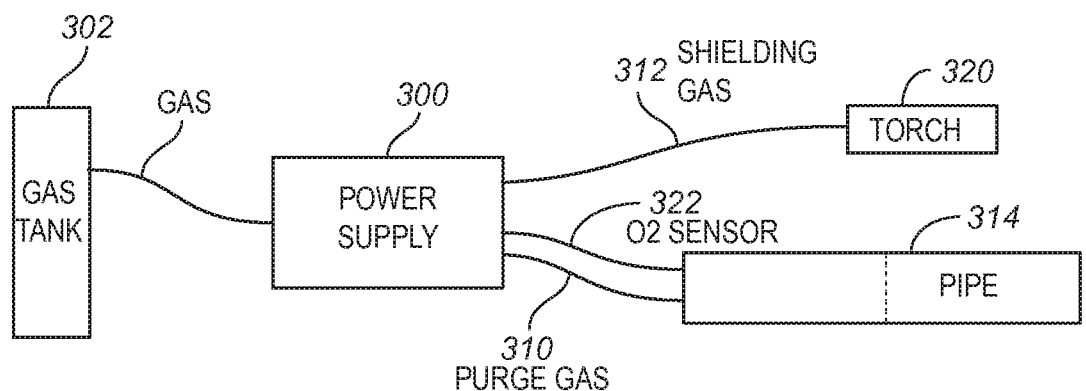
FIG. 3A illustrates a welding power supply arrangement employing principles of the disclosure relating to supply of purge and shielding gas and control of welding atmosphere.

In FIG. 3A it is shown that a welding power supply 300 can be configured to receive purge gas from a source 302, via a suitable connection such as a quick disconnect connection, or a threaded connection. The gas source 302 is representative of any suitable source such as a portable tank or container or a permanently installed tank or container, without or without intermediary components such as a gas purifier, a regulator, a flowmeter and/or a shutoff valve.

The inert gas then is output from the welding power supply 300 via a purge gas line 310 and a shielding gas line 312, both of which have suitable connection to the welding power supply. The purge gas line 310 is used to introduce the purge gas into the interior of pipe section(s) 314 to be welded. Of course, the sections 314 can be a single section if, the welding does not involve welding together two sections, but rather, e.g., patch welding, repair welding or some other type of welding.

The inert gas is also output from the welding power supply 300 via the shielding gas line 312 to a gun or torch 320. The shielding gas, as described above, is introduced at the point of welding to reduce the amount of oxygen at the point of welding as well.

As also illustrated, preferably, the output of an oxygen sensor positioned within the pipe section(s) 314 is fed back to the power supply 300 via a communications line 322. In FIG. 3A, line 322 is only intended to be representative of communication of the signal, not the physical form in which the signal can be communication. As described below, communications can occur over hard wire or wireless communications.

Figure 3B:
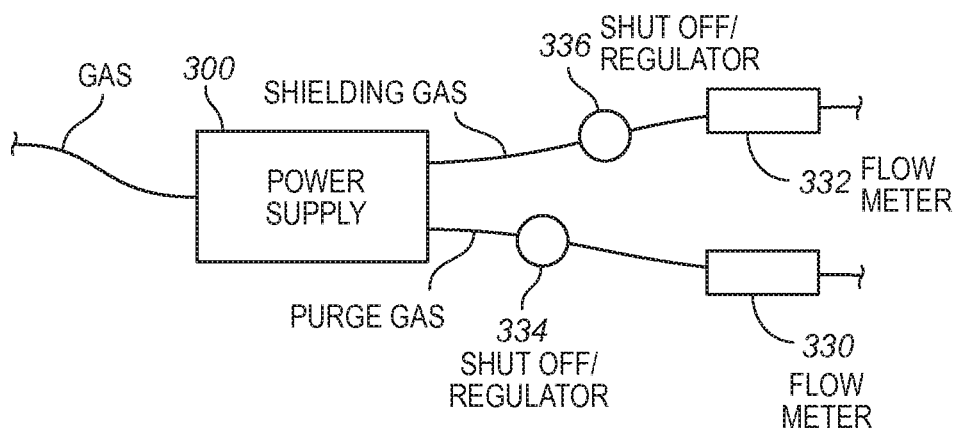
FIG. 3B illustrates a welding power supply arrangement employing principles of the disclosure relating to control of purge and shielding gas.

In FIG. 3B, it is illustrated that the inert gas output to the gun or torch 320 and the pipe section(s) 314 can be monitored with flow meters 330 and 332, respectively, and controlled by means of shutoffs/regulators 334 and 336, respectively. As can be appreciated, employing shutoffs/regulators that can be controlled by the power supply 300 enables good control over the amount and flow of inert gas used by either or both the gun or torch 320 and the pipe section(s) 314.

As explained in greater detail below, in a preferred embodiment the shutoffs/regulators 334 and 336 are located within the housing of the power supply 300 so that the power supply provides a complete control solution in an integrated device.

Figure 4A:
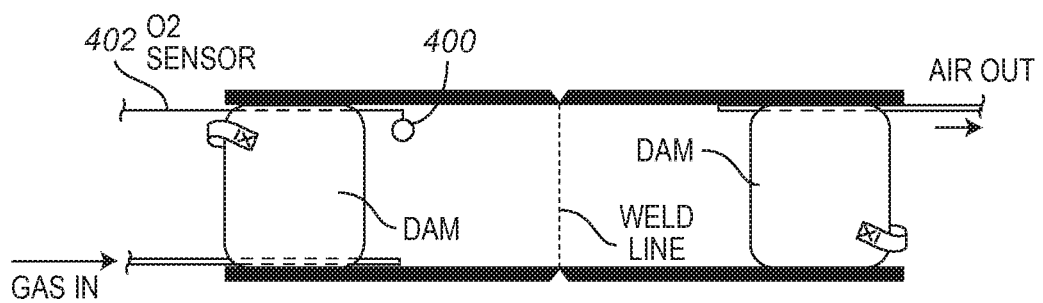
FIG. 4A illustrates in cross section a flow dam arrangement employing principles of the disclosure relating to an oxygen sensor with wired communication capabilities.

In FIG. 4A, it is again illustrated that an oxygen sensor 400 can be a wired sensor with a hard wire 402 leading to the power supply 300.

Figure 4B:
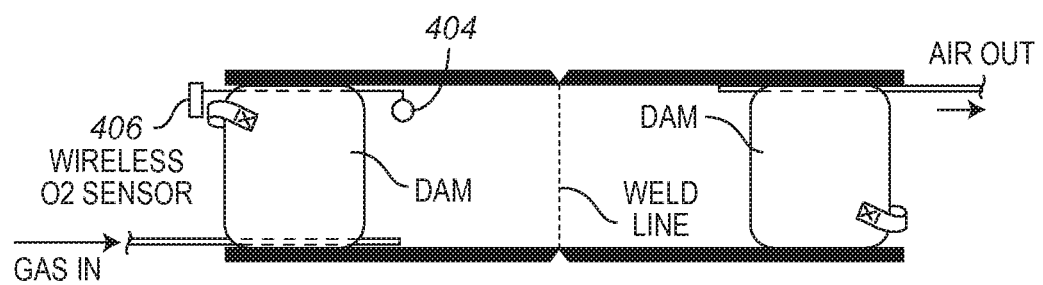
FIG. 4B illustrates in cross section a flow dam arrangement employing principles of the disclosure relating to an oxygen sensor with wireless communication capabilities.

In FIG. 4B, it is illustrated that an oxygen sensor 404 can include a wireless communications interface 406 utilizing one or more of the Bluetooth(R), wireless local area network, wide area network and infrared communications protocols. These protocols are well known and easily implemented with available modules.

Figure 5A:
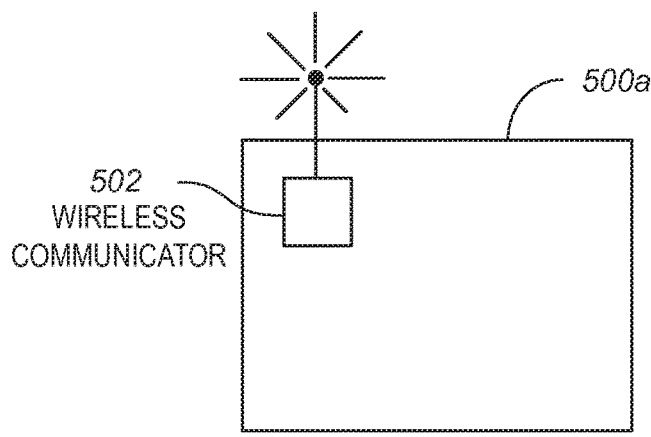
FIG. 5A illustrates a welding power supply with wireless communication capabilities.

In FIG. 5A, it is illustrated that a controller 500a can include a wireless communications module 502 to provide a wireless communications interface utilizing one or more of the Bluetooth(R), wireless local area network, wide area network and infrared communications protocols. With such a module 502, the controller 500a can communicate end of purge time or the occurrence of a fault to an operator via any of these protocols. Thus, e.g., an operator could be engaged in another task and receive a text, voicemail, email, etc, alerting as to end of purge time. Another alert might involve lose of a sensor signal. Similarly, an alert can be communicated over a local area network to any suitable device, including an alarm coupled to the network.

Figure 5B:
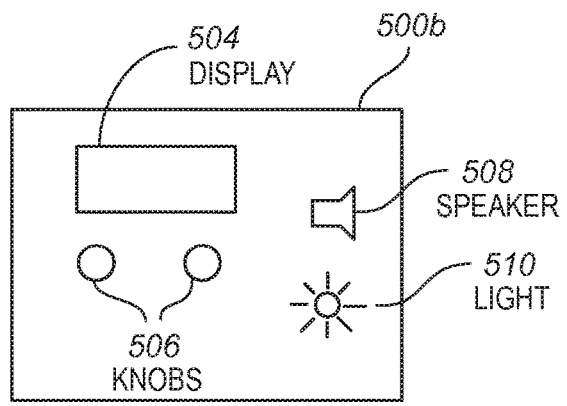
FIG. 5B illustrates a welding power supply with one option for purge gas parameter input capability.

In FIG. 5B there is illustrated a configuration of a controller 500b in which the controller includes a display 504 via which any manner of relevant information can be displayed. Such information can include data or purge parameter input prompts, confirmation messages and purge time estimates. Rotatable knobs 506 representative of any number of knobs can be used to provide dedicated data inputs. For example, one knob can be used for input-pipe lengths. Another knob can be dedicated to the input of pipe diameters. Another knob can be dedicated to the input of metal types. Alternatively, the date input can be a value for the volume itself. With the data input via the knobs, the controller 500b can calculate, or recalculate, an estimated purge time, and display the result on the display 504.

As also illustrated in FIG. 5B, the controller 500b can be configured to drive a speaker or audible device 508 and a visual signaling device such as a light 510. When purge conditions are reached, as sensed by the oxygen sensor, the controller 500b can alert the operator via the speaker/audible device 508 and/or the visual signaling device 510.

Figure 5C:
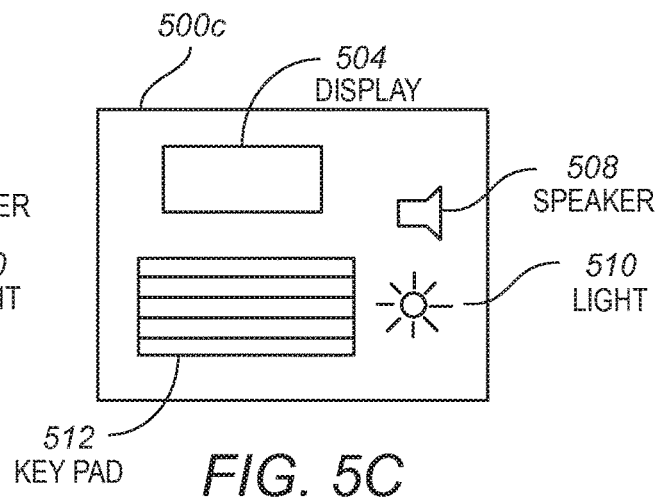
FIG. 5C illustrates a welding power supply with another option for purge gas parameter input capability.

In FIG. 5C there is illustrated a controller 500c that is similar to the controller 500b, but which includes a keypad 512 rather than knobs for data input. Such keypads commercially available.

Figure 5D:
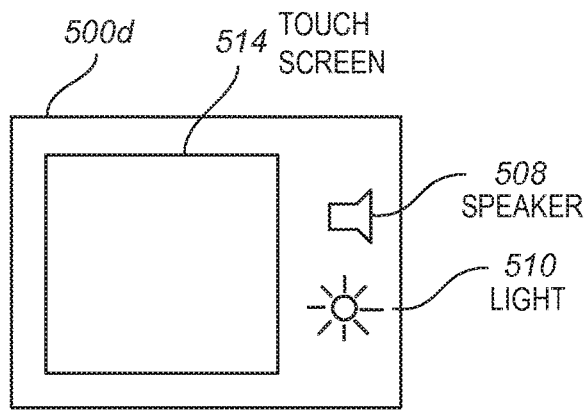
FIG. 5D illustrates a welding power supply with yet another option for purge gas parameter input capability.

In FIG. 5D there is illustrated a controller 500d that is similar to the controllers 500b and 500c, but which instead of a separated display and date input device, includes a touch screen 514 that integrates both display and tactile sensing functions in a single device.

The displays described above can be of any suitable type including liquid crystal displays, organic electroluminescent displays and light emitting diode displays. However, for industrial applications, the use of industrial grade displays are commercially available and preferred.

Figure 6:
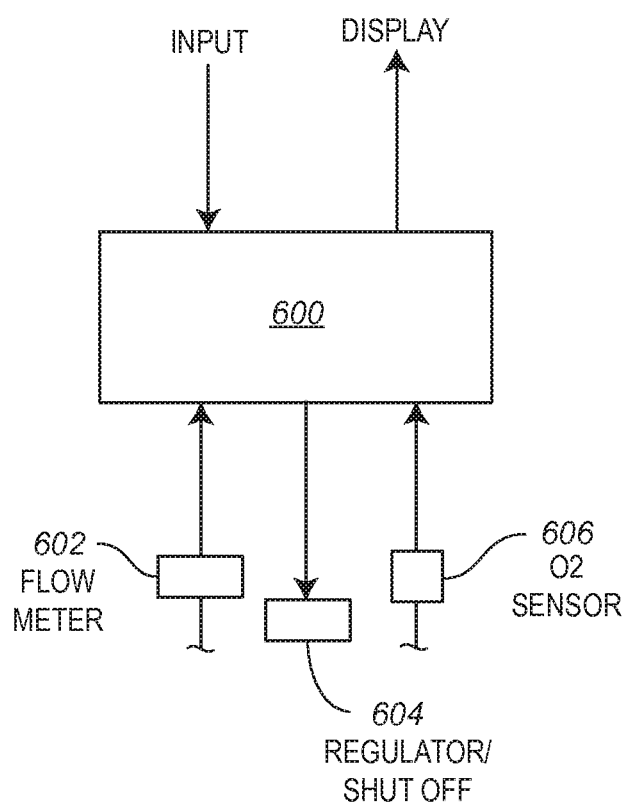
FIG. 6 illustrates a welding power supply controller employing principles of the disclosure relating to signals input into and output by the controller.

In FIG. 6, there is representationally illustrated a processor module 600 used in any of the above described controller configurations. As illustrated, the processor module 600 is in communication with signals from the parameter input device(s), the display, one or more flowmeters 602, one or more regulators/shut off valves 604 and one or more oxygen sensors 606. Again, the lines of communication are representative of any suitable communications method be it hard wired or wireless. The flowmeters 602 can be in any of the lines between the source of the inert gas and the power supply, between the power supply and the interior of the container to be welded and between the power supply and the gun or torch. The regulators/shutoff valves 604 can be in any of the lines between the source of the inert gas and the power supply, between the power supply and the interior of the container to be welded and between the power supply and the gun or torch. The oxygen sensor(s) 606 would, of course be positioned to sense oxygen levels within the container to be welded.

Regardless of the particular data input means utilized, the controller preferably utilizes the data, also referred to herein a purge gas parameters to calculate purge time using the above mentioned relationship wherein the purge time is a function of flow rate and the size of the volume to be purged. Again, the general formula for a pipe or tubular volume is: $PT=(4 \times D \times L)/PR$, where PT is the purge time (typically minutes), D is the diameter of the pipe, L is the length of the pipe and PR is the purge rate (typically in cubic feet per hour). For a rectangular container, the formula can be $PT=(4 \times H \times W \times L)/PR$, where PT is the purge time, H is a height of the container, W is a width of the container, L is a length of the container and PR is the purge rate. Obviously, the formula for determining the volume of the enclosed space, the walls or walls of which are to be subject to the welding, can vary depending upon the shape of the enclosed space, and in some instances, if of a complicated shape, might need to be approximated by a more simplified formula. The goal is to approximate as best as possible the purge time needed for a given interior space, and to let the oxygen sensor(s) determine ultimate end of purge time.

Again, alternatively, the data input can more simply be a value for the volume itself, expressed, in cubic units, or other volume measurements.

The oxygen content in the purged atmosphere is the ultimate determinant of oxygen purging sufficiency or completeness. Thus, the feedback from the oxygen sensor(s) can be used to signal end of purge time. If so programmed, the end of purge time can be signaled at different oxygen levels to take into account different metals. Welding conditions are usually reached when the oxygen sensor indicates a suitable value such as below 70 PPM for stainless steel or below 50 PPM for titanium. Semiconductors can require a level below 10 PPM. Purging can continue until the weld seam has cooled sufficiently so that oxidation can no longer occur. The controller 300 can be programmed with a lookup table with the different oxygen levels for different metals, and the operator can be prompted to select a metal to be welded when entering the purge gas parameters.

Also, if programmed to received gas flow feedback from a flow meter in the purge gas line, the controller can regulate purge gas flow to keep it at or below a maximum level to minimize turbulence in the volume being purged. As mentioned above, minimizing turbulence minimizes the agitations of the oxygen in the volume and enables more effective displacement of the oxygen by the purge gas.

Preferably, during purging, the gas flow is 30 cubic feet per hour or less. After the desired oxygen level is reached, the flow can be reduced to a much lower flow, for example, and preferably, 8 to 10 cubic feet per hour.

Figure 7:
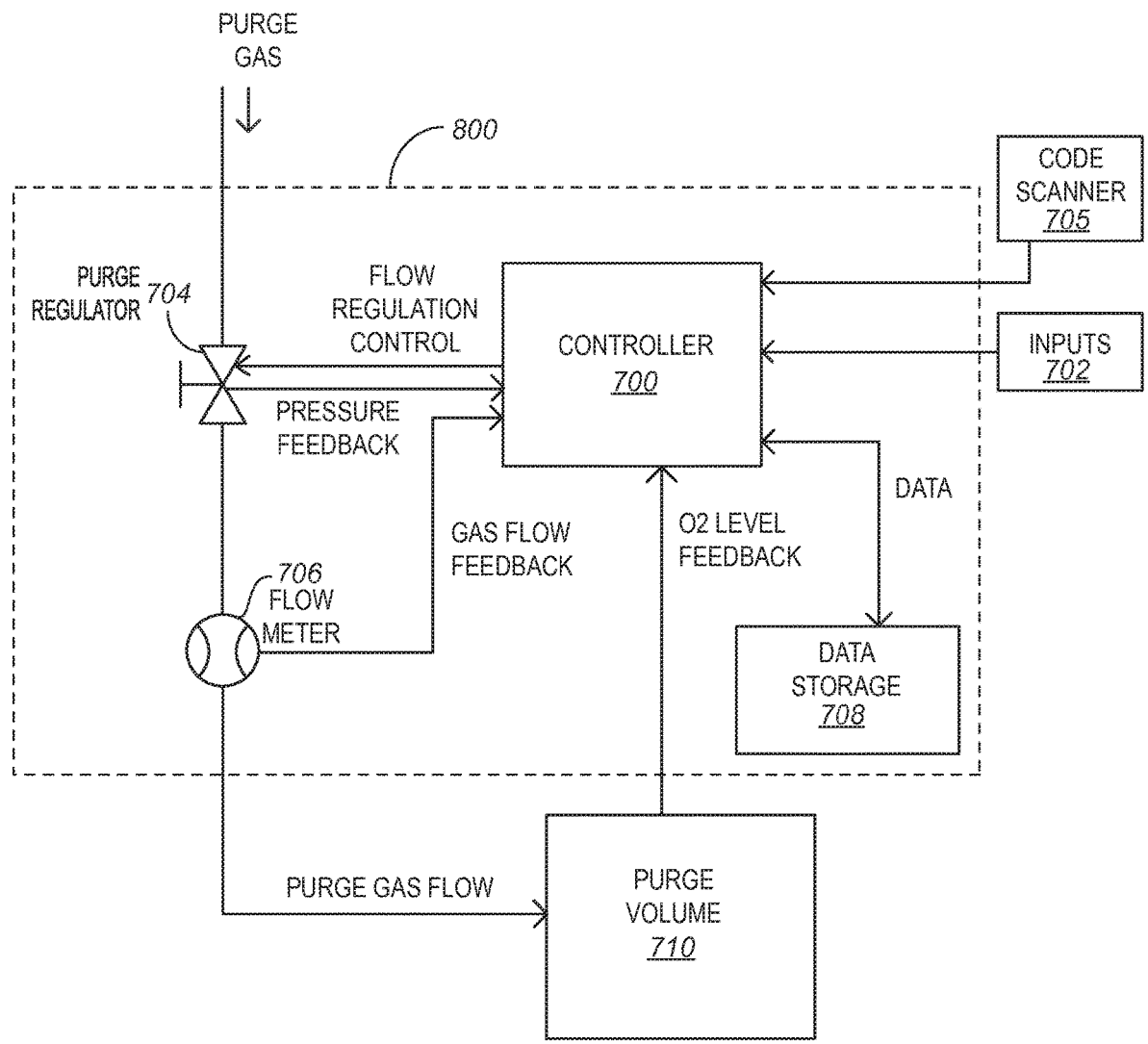
FIG. 7 illustrates a control scheme employing principles of the disclosure.

In FIG. 7, there is illustrated a more detailed control scheme. As illustrated, a controller 700 can be used to implement any suitable logic in which the controller 700 can receive volume data such as purge parameter inputs, calculate a purge time using the value for or dimensions of the volume to be purged, as described above, and then control the purge gas input into the volume.

To that end, the controller 700 receives volume or purge parameter data via an input 702, which is representative of any suitable input means, including those discussed above. Additionally, a bar code scanner device 705 can be placed in communication with the controller 700 so that the scanner 705 can be used to read bar codes or similar coding placed on the various devices used in the welding process so that a record can be had of the devices used. It should also be noted, that the bar code scanner 705, or a similar scanning device, could be used to input all parameters, if, for example, such parameters were in a catalog or list and a set of parameters were associated with a bar code or similar code such as a Q code.

The controller 700 controls purge gas regulator 704 in accordance with a desired flow rate, such as 30 CFH during the main purge period, and 8-10 CFH thereafter until end of welding. The regulator 704 can feed back purge gas pressure information to the controller. Especially at end of purge, it is helpful to reduce purge gas pressure to prevent overpressure causing excessive outflow of gas at the welding joint or when disconnecting the purge gas line.

At the same time, the controller 700 receives purge gas flow information from flow meter 706 which is in the path of the purge gas flowing into the volume to be purged of oxygen.

Additionally, the oxygen sensor 708 feeds back to the controller 700 measurements of the oxygen level within the volume being purged.

For simplicity, a shielding gas line is not shown in this figure. However, it is easily understood how any meter therein and any regulator therein would be in communication with the controller as well.

A data storage or memory 710 is also suitably connected to the controller 700, or at least the processor thereof and is used to store data such as the inflowing purge gas pressure, the purge gas flow levels, the oxygen levels in the volume being purged, time lapse data, equipment information (if any) or whatever information may be desired to provide an audit trail. In a simplified version, the data are stored with suitable time and date stamps or records so that a complete audit trail of a weld operation can be made. This data then also is or can be associated with devices recorded as being used in one or more welding operations. With such an audit trail, it is possible to review a welding process and the devices used at a later time. Further, the data can be communicated in real or a later time to a remote device over a suitable wireless network or wired network, or a portable memory device (e.g., a USB storage drive or other type of storage medium).

As such, one possible control algorithm that can be implemented by the controller can include:

First, receiving parameters defining the volume to be purged

Second, calculating an expected purge time based on a predetermined flow rate for the purge gas and the size of the volume to be purged (using a suitable formula such as the formula above for a tubular volume).

Third, opening the purge gas shutoff value to allow purge gas to flow.

Fourth, regulating the flow of the purge gas to be at or below the predetermined flow rate, using actual flow rate feed back from a suitable sensor.

Fifth, monitor and regulate the back pressure of the purge gas inflowing into the volume using the pressure sensed by the regulator.

Sixth, continuously monitor the oxygen level in the volume being purged.

Seventh, (a) signaling end of purge time when the oxygen levels within the volume reach a predetermined threshold (e.g., via a visual or audible alarm or via a message delivered to a remote device), and (b) reducing the purge gas flow rate to at or below a predetermined flow rate sufficient to maintain the low oxygen level atmosphere within the volume.

Eighth, stopping the flow of the purge gas after receiving a command to do so by the operator.

Ninth, allowing, if necessary, purge gas to bleed out of the purge gas line to prevent overpressure of purge gas.

It can be appreciated that in addition, the pressure within the volume can also be monitored, as describe in connection with FIG. 1, and detection of pressure above a threshold can be used to signal the operator, to reduce the purge gas flow rate, stop the flow of the purge gas, or any combination of the foregoing.

Preferably, the controller 700, the purge gas regulator 704, the purge gas flow meter 706, and data storage are located within a welding power system housing 800. The housing 800 thus would have at least an electrical connection for receiving the feedback signal from the oxygen sensor if hard wired communications are to be accommodated. The housing may also need an electrical connection for the bar code scanner if hard wired communications are to be accommodated. These electrical connections would be in addition the purge gas as and shielding gas inlet and outlet connections. All such types of electrical and gas line connections are well known and are not further described herein.

Again, although a welding power supply is used as the illustrative embodiments, the principles disclosed herein are applicable across other welding power systems which can contain therein a controller and purge flow control devices within the housing thereof.

The controllers discussed herein can be implemented using microprocessor based devices that can be programmed either with machine readable instructions and/or coupled to firmware or other circuitry. Indeed, current controllers already in use in many welding power systems can be adapted with additional programming. Thus, the specific devices that can make up a controller are not further illustrated herein.

It can be appreciated from the foregoing descriptions, that a welding power system preferably is configured to include:

inlet and outlet connections for the purge gas and an outlet connection for the shielding gas;

at least an electrical input for an oxygen sensor;

a controller;

a purge gas flow regulator and a purge gas flow meter between the purge gas inlet and outlet connections;

a display; and a data input device via which an operator can provide a value of a volume or purge gas parameters to the controller, wherein, the controller is logically configured to receive the volume value or purge gas parameters and calculate a purge time and control purge gas flow based on at least the oxygen sensor signal.

While various aspects and embodiments have been disclosed, other aspects and embodiments are contemplated. The various aspects and embodiments disclosed are for purposes of illustration and are not intended to be limiting, with the true scope and spirit being indie sited by the following claims.

The foregoing method descriptions and related diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The logical blocks, modules, circuits, and algorithm steps may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent, a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement, these systems and methods is not limiting of the invention. Thus, the operation and behavior of the systems and methods were described without reference to the specific software code being understood that, software and control hardware can be designed to implement the systems and methods based on the description here.

What is claimed is:

1. A welding power system comprising:
   one or more oxygen sensors arranged within a volume of an interior of one more pieces to be welded;
   a wired communication line configured to connect the one or more oxygen sensors to an oxygen analyzer outside of the volume, the wired communication line extending from within the interior, past a dam configured to seal the volume, and to the oxygen analyzer, wherein the one or more oxygen sensors are configured to:
   measure an oxygen level while arranged within the volume;
   generate signals indicative of an oxygen level within the volume; and
   transmit the signals out from the volume via the wired or wireless communication line; and
   a controller configured to:
   receive the signals indicative of the oxygen level via the wired or a wireless communication line; and
   receive data from a data input device via which an operator can input parameters of or relating to a value of the volume of the interior of the one more pieces to be welded.

2. The welding power system of claim 1, wherein the controller is logically configured to receive an output from a flow meter and monitor flow of the purge gas into the volume.

3. The welding power system of claim 1, wherein the controller is logically configured to receive outputs from the one or more oxygen sensors and determine if a threshold oxygen level within the volume is met.

4. The welding power system of claim 1, wherein the one or more oxygen sensors are further configured to:
   calculate and output a purge time, the purge time being a time period needed to replace an atmosphere within the volume with a purge gas at a predetermined flow rate of the purge gas; and
   control flow of a purge gas into the volume based on the oxygen level.

5. The welding power system of claim 4, wherein:
   the controller is logically configured to receive an output from a flow meter and monitor flow of the purge gas into the volume;
   the welding power system includes a memory in communication with the controller; and
   the controller is logically configured to store in the memory purge gas flow measurements, oxygen level measurements, the purge gas parameters, the purge time, or time stamp data associated with any of the foregoing, or any combination of the foregoing.

6. The welding power system of claim 1, wherein the controller includes a communication module and the controller is logically configured to signal elapse of purge time by communicating an alert to the operator via the communications module.

7. The welding power system of claim 1, further including an audible alert device in communication with the controller, and the controller is logically configured to signal elapse of purge time by communicating an alert to the operator via the audible alert device.

8. The welding power system of claim 1, further including a visual alert device in communication with the controller, and the controller is logically configured to signal end of purge time by communicating an alert to the operator via the visual alert device.

9. The welding power system of claim 1, further including a communications module in communication with the controller, and the controller is logically configured to communicate a message via the communication module.

10. The welding power system of claim 9, wherein the communications module includes a wireless communication module via which the message is communicated, the wireless communications module configured to communicate via a cellular communications network.

11. The welding power system of claim 1, including a wireless communications module in communication with the controller and at least one wireless transmitter electrically connected to the one or more oxygen sensors.

12. The welding power system of claim 1, including a wireless communication module in communication with the controller and at least one flow meter.

13. A welding power system comprising:
    a data input device;
    a flow meter signal input;
    an oxygen sensor arranged within a volume of an interior of one more pieces to be welded, the oxygen sensor configured to:
    measure an oxygen level while arranged within the volume;
    generate electrical signals indicative of the oxygen level within the volume;
    transmit the electrical signals out from the volume via a wired or wireless communication line; and
    a purge gas flow regulator; and
    an oxygen analyzer located outside the volume, the analyzer comprising an electrical connection and a controller, the controller configured to:
    receive the electrical signals indicative of the oxygen level at the electrical connection via the wired or wireless communication line;
    receive by way of the input device purge parameters defining or a value of a volume or within an interior of one or more pieces to be welded by way of the input device;
    calculate a purge time based on the purge parameters and a predetermined purge gas flow rate, the purge time being a time period needed to replace an atmosphere within the volume with a purge gas at a predetermined flow rate of the purge gas;
    generate a flow regulator control signal based on a flow meter signal and the oxygen level received from the oxygen sensor signal.

14. The welding power system of claim 13, wherein the controller includes a communication module and the controller is logically configured to signal elapse of purge time by communicating an alert to the operator via the communications module.

15. The welding power system of claim 13, including an audible alert device in communication with the controller, and the controller is logically configured to signal elapse of purge time by communicating an alert to the operator via the audible alert device.

16. The welding power system of claim 13, including a visual alert device in communication with the controller, and the controller is logically configured to signal end of purge time by communicating an alert to the operator via the visual alert device.

17. The welding power system of claim 13, including a communications module in communication with the controller, and the controller is logically configured to communicate a message via the communication module.

18. The welding power system of claim 13, wherein the communications module includes a wireless communication module via which the message is communicated.

19. The welding power system of claim 13, wherein the wireless communications module is configured to communicate via a cellular communications network.

20. The welding power system of claim 13, wherein the wireless communications module is configured to communicate via a wireless communications network.

21. The welding power system of claim 13, including a wireless communications module in communication with the controller and at least one wireless transmitter electrically connected to the one or more oxygen sensor.

22. The welding power system of claim 13, further comprising a memory in communication with the controller, wherein the controller is logically configured to store in the memory purge gas flow measurements, oxygen level measurements, the purge gas parameters, the purge time, or time stamp data associated with any of the foregoing, or any combination of the foregoing.

23. A welding power system, comprising:
a housing;
inlet and outlet connections for purge gas located on the housing;
at least an electrical input to receive an electrical signal from for an oxygen sensor located within a volume of an interior of one more pieces to be welded, the oxygen sensor configured to:
 measure an oxygen level while arranged within the volume;
 generate electrical signals indicative of the oxygen level within the volume; and
 transmit the electrical signals out from the volume via a wired or wireless communication line;
a controller located within the housing;
a purge gas flow regulator and a purge gas flow meter in communication with the controller and located within the housing between the purge gas inlet and outlet connections;
a display located on the housing; and
a data input device located on the housing via which an operator can provide purge gas parameters to the controller, wherein, the controller is logically configured to:
 receive the electrical signals indicative of the oxygen level via the wired or wireless communication line,
 receive the purge gas parameters based on the parameters and given purge gas flow rate, and
 control purge gas flow via the purge gas flow regulator based on at least a signal from the oxygen sensor.

24. The welding power system of claim 4, wherein the controller is logically configured to control a flow regulator in accordance with the purge time and the oxygen level received from the oxygen sensor.

25. The welding power system of claim 13, wherein the wired communication line is configured to connect the oxygen sensor to the oxygen analyzer located outside of the volume, the wired communication line extending from within the interior, past a dam configured to seal a portion of the volume, and to the oxygen analyzer.

* * * * *